(12) United States Patent
Ubiñana Felix

(10) Patent No.: US 11,608,845 B2
(45) Date of Patent: Mar. 21, 2023

(54) DETACHABLE FASTENING SYSTEM FOR TWO INTERSECTING FORMWORK BEAMS

(71) Applicant: SISTEMAS TECNICOS DE ENCOFRADOS, S.A., Parets del Valles (ES)

(72) Inventor: Jose Luis Ubiñana Felix, Parets del Valles (ES)

(73) Assignee: Sistemas Tecnicos de Encofrados, S.A., Parets del Valles (ES)

( * ) Notice: Subject to any disclaimer, the term of this patent is extended or adjusted under 35 U.S.C. 154(b) by 1009 days.

(21) Appl. No.: 16/330,347

(22) PCT Filed: Aug. 3, 2017

(86) PCT No.: PCT/ES2017/070569
§ 371 (c)(1),
(2) Date: Mar. 4, 2019

(87) PCT Pub. No.: WO2018/050935
PCT Pub. Date: Mar. 22, 2018

(65) Prior Publication Data
US 2019/0226513 A1   Jul. 25, 2019

(30) Foreign Application Priority Data

Sep. 16, 2016   (ES) .................. 201631211

(51) Int. Cl.
*F16B 7/04* (2006.01)
*E04G 11/52* (2006.01)
(Continued)

(52) U.S. Cl.
CPC ............ *F16B 7/0493* (2013.01); *E04G 11/50* (2013.01); *E04G 11/52* (2013.01); *E04G 17/02* (2013.01); *E04G 17/04* (2013.01); *F16B 2/248* (2013.01)

(58) Field of Classification Search
CPC .......... F16B 7/0493; F16B 2/248; F16B 7/04; E04G 11/50; E04G 11/52; E04G 17/02; E04G 17/04
See application file for complete search history.

(56) References Cited

U.S. PATENT DOCUMENTS

| 1,929,302 A * | 10/1933 | Boyle | F16B 2/248 |
| | | | 403/387 |
| 2,998,109 A * | 8/1961 | Jahn | F16B 2/248 |
| | | | 403/387 |

(Continued)

FOREIGN PATENT DOCUMENTS

| AU | 568617 B2 | 1/1988 |
| CN | 2801963 Y | 8/2006 |

(Continued)

OTHER PUBLICATIONS

Colombian Office Action and Patent Search Report for Colombian Patent Application No. NC2019/0001647, dated Mar. 2, 2020 in 6 pages.

(Continued)

*Primary Examiner* — Adriana Figueroa
(74) *Attorney, Agent, or Firm* — Knobbe, Martens, Olson & Bear, LLP

(57) ABSTRACT

Detachable fastening system for two formwork beams, an upper beam, a lower beam, a device for connecting the upper beam to the lower beam. Said device comprises a resilient one-piece structure having two curved arms which connect zones intended to press one of said beams in support zones and zones intended to be fastened to the other beam, the system having connection means which connect the device to said beam such that it cannot be lost, and said device having the ability to slide relative to the beam to which it is (Continued)

fastened, the system having means for increasing the friction between the lower beam and the upper beam.

14 Claims, 19 Drawing Sheets

(51) Int. Cl.
| | | |
|---|---|---|
| *E04G 17/02* | (2006.01) | |
| *E04G 17/04* | (2006.01) | |
| *F16B 2/24* | (2006.01) | |
| *E04G 11/50* | (2006.01) | |

(56) References Cited

U.S. PATENT DOCUMENTS

| | | | | |
|---|---|---|---|---|
| 3,102,614 | A | | 9/1963 | Lydard |
| 4,559,751 | A | * | 12/1985 | Rogers .................. E04B 9/127 |
| | | | | 52/712 |
| 4,735,030 | A | * | 4/1988 | Judkins .................. E04B 9/26 |
| | | | | 403/387 |
| 4,809,476 | A | * | 3/1989 | Satchell .................. E04B 2/76 |
| | | | | 52/843 |
| 5,203,132 | A | * | 4/1993 | Smolik .................. E04B 2/7409 |
| | | | | 52/690 |
| 5,577,699 | A | * | 11/1996 | Gardner .................. A47F 5/08 |
| | | | | 248/302 |
| 8,061,099 | B2 | * | 11/2011 | Andrews .................. E04B 2/82 |
| | | | | 52/475.1 |
| 8,074,416 | B2 | * | 12/2011 | Andrews .................. E04B 2/767 |
| | | | | 403/230 |
| 8,720,155 | B1 | | 5/2014 | Robell |
| 10,158,323 | B2 | * | 12/2018 | Schulte .................. H02S 40/30 |
| 2008/0110126 | A1 | * | 5/2008 | Howchin .................. E04C 3/32 |
| | | | | 52/630 |
| 2008/0250738 | A1 | * | 10/2008 | Howchin .................. E04B 2/789 |
| | | | | 52/235 |
| 2017/0254081 | A1 | * | 9/2017 | Castellucci .................. B21D 5/08 |

FOREIGN PATENT DOCUMENTS

| | | |
|---|---|---|
| CN | 202108821 U | 1/2012 |
| CN | 204003828 U | 12/2014 |
| CN | 104416622 A | 3/2015 |
| CO | 06122765 | 12/2006 |
| DE | 1832988 U | 6/1961 |
| DE | 2415013 A1 | 10/1975 |
| EP | 2309077 A2 | 4/2011 |
| ES | 2310956 A1 | 1/2009 |
| FR | 2159775 A5 | 6/1973 |
| FR | 2706514 A1 | 12/1994 |
| GB | 746955 A * | 3/1956 |
| JP | S53 55072 U | 5/1978 |
| MX | 2016005077 A | 5/2016 |
| NL | 7705399 A | 11/1977 |
| WO | 2016/189182 A1 | 12/2016 |

OTHER PUBLICATIONS

Chinese Office Action issued for Chinese Patent Application No. 201780054826.8, dated Apr. 25, 2021 in 8 pages.
Spanish Search Report for Application No. 201631211 dated Apr. 26, 2017 in 4 pages.
International Search Report and Written Opinion for PCT Application No. PCT/ES2017/070569, dated Dec. 8, 2017 in 11 pages.

* cited by examiner

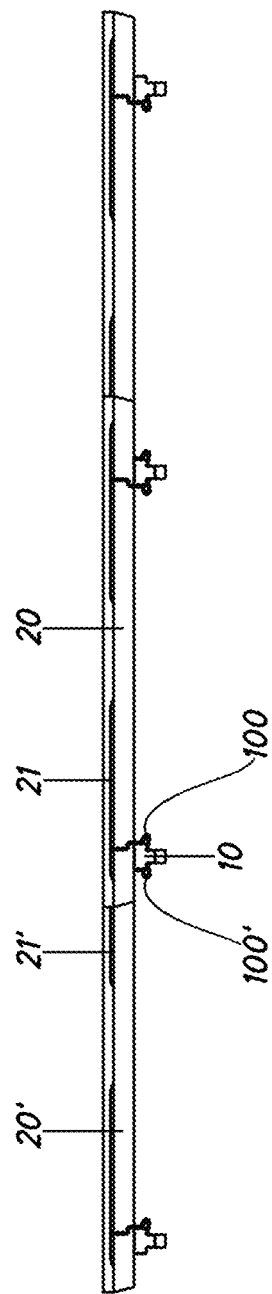

DETACHABLE FASTENING SYSTEM FOR TWO INTERSECTING FORMWORK BEAMS

CROSS-REFERENCE TO RELATED APPLICATIONS

This application is the U.S. National Phase under 35. U.S.C. § 371 of International Application PCT/ES2017/070569, filed Aug. 3, 2017, which claims priority to Spanish Patent Application No. 201631211, filed Sep. 16, 2016. The disclosures of the above-described applications are hereby incorporated by reference in their entirety.

DESCRIPTION

Field of the Invention

The present invention relates to a detachable system for fastening two intersecting formwork beams, providing substantial characteristics of novelty and inventive step.

Background of the Invention

Formwork beams are usually I-shaped beams usually made of wood, metals or mixtures of both, that is, made up of a metal portion and a wooden portion.

I-shaped wooden beams are used extensively in the construction industry in most industrially advanced countries and are used, in particular, to support formwork, preferably roof formwork.

Traditionally, beams, including I-shaped wooden, metal or mixed beams, are installed at two levels, a lower level of beams supported directly by props and an upper level of beams arranged perpendicularly to the lower level beams and resting on the first beams.

Numerous roof formwork systems are known in the prior art which are based on the use of a level made up of a first series of beams arranged in parallel and supported by props, on which another level rests made up of a second series of beams arranged perpendicularly to the first series of beams.

Among the systems of the prior art, those known as 'Meccano'-type systems stand out, which comprise a first level of metal beams comprising housings in the upper portion thereof, on which housings the upper level beams fit. Said systems are quick but not very flexible and are not always capable of being adapted to the geometry of complex construction work.

Furthermore, systems having wooden beams are also known which allow the beams of one level to be nailed in any position to the beams of the other level. This is a laborious, though effective, system which, apart from its simplicity and adaptability, has many drawbacks, such as a reduction in the useful life of the beams owing to the wear produced by the action of the nails, the dismantling and removal of the nails, which requires a great deal of labour and the fact that the strength of the connection is difficult to quantify, as it depends on numerous variable factors, such as the diameter of the nail, the angle and depth of nailing, the state of the wood, etc. Of course, this system also presents the problem that the material used must be wood and not another material, such as metal.

As well as the method for fastening wooden beams by nailing, other fastening systems are also known, such as producing various types of clamps with the use of threaded bolts and tightening nuts, as well as wedge systems. In all these cases, manual tightening is necessary, with the resulting discretionary and therefore variable characteristics.

To overcome the above-mentioned drawbacks and produce fastening devices for I-shaped wooden, metal or mixed beams that have the characteristics of ease of application, very controllable and constant tightening pressures, and little dependence on human assembly, devices exist which usually comprise a one-piece structure made of a resilient material having two separated compression zones for simultaneous tightening in the support zones of the two beams to be connected, by fastening one of the beams to the other, said compression zones being interconnected by means of intermediate arms.

A first problem with known devices is that they comprise small parts, which entails various negative consequences. Firstly, it is easy for the parts that make up the devices to get lost during construction work and when said parts are needed they are not to hand, which encourages the use of alternative, inferior and less desirable solutions. Furthermore, when said known fastening devices are used with metal beams, the resulting connection is not very stable, as the friction between beams is low and the slightest blow may destabilise the structure by causing relative slippage between the beams.

SUMMARY OF THE INVENTION

To overcome the above-mentioned drawbacks, the present invention discloses a detachable fastening system for two intersecting formwork beams, said beams forming between them a non-zero angle, and said system comprising:
  an upper beam for supporting formwork panels,
  a lower beam on which the upper beam rests and which forms a non-zero angle with the upper beam and
  a device for connecting the upper beam to the lower beam,
in which said device comprises a resilient one-piece structure having two curved arms which connect zones intended to press on one of said beams in support zones and zones intended to be fastened to the other beam, the system having connection means between the device and the beam, to which said device is fastened, which connect the device to said beam such that it cannot be lost, thus allowing said beam and the device to be handled together like a single part, the device having the ability to slide relative to the beam to which it is fastened, and the system having means for increasing the friction between the lower beam and the upper beam.

The system according to the invention prevents the connection device between beams from being lost by means of a failsafe fastening to one of the beams. In addition, said system has means for increasing the friction between beams, preventing unwanted sliding between beams. This allows for the use of metal or mixed metal-metallic beams.

Preferably, as a means for increasing the friction between the beams, it can be provided for said friction-increasing means to comprise a protuberance on a contact face between said upper beam and said lower beam. Preferably, said protuberance is located on an upper surface of the lower beam or on a lower surface of the upper beam. More preferably, the protuberance is located on the lower surface of the upper beam.

The protuberance, apart from increasing the friction between beams in order to further increase the load required for sliding to take place, also limits any sliding between beams should it occur. In short, the result is a very stable connection between beams.

Optionally, the protuberance comprises two parallel, toothed lines arranged longitudinally. Also optionally, the protuberance projects outwards from the surface of the beam on which said protuberance is located.

It is also provided for said friction-increasing means to cause elastic deformation of the device clamping or gripping both beams and pressing them together. Said means may be additional to other means such as said protuberance, or may replace said means, if the elastic deformation achieved is great enough. However, the applicant has ascertained that the use thereof in combination with other means such as the protuberance is clearly advantageous.

Preferably, said device is pre-stressed. The fact that the device is pre-stressed means that the resilient structure is stressed in the rest state. This ensures that a given force must exist for the beams to slide relative to one another, or for any type of movement between beams to occur.

In an embodiment of the invention, the contact surface between beams and between beam and connection device are all metal.

In an embodiment of the invention, the bent zones of the device slide along lateral grooves of the upper beams of the connections of the two intersecting beams. Optionally, the lateral grooves of the upper beam are formed in the lower portion of a mixed beam.

Preferably, the one-piece structure of the device consists of a rod made of a resilient material which has two curved arms which terminate at the upper ends thereof in bent zones for insertion in grooves arranged on a beam, whilst at the other end said arms extend as a cross member for pressing on support zones of the other beam to be fastened.

In an embodiment of the invention, the curved arms together with the cross member form a U-shaped bridge. Optionally, the two curved arms form between them a slight angular divergence, opening upwards. In addition, and advantageously, the U-shaped bridge is planar.

Optionally, the support zones of the beams to be connected comprise flanges of a beam, the support zones of the beams to be connected optionally comprising the upper flanges of a beam.

The material of the one-piece structure of the device may be steel, such as steel having highly resilient characteristics for example, a synthetic material or a composite material, among others.

It will be observed that the device according to the present invention has characteristics that are of great interest for the purpose for which it is intended in the construction sector. Indeed, as can be deduced from the above, the novel device allows quick and economical production, and in being coupled to a connection for metal beams, provides great security, as the prior stress of the device together with the grooving of the lower beam provide stable fastening against unexpected disturbance such as a blow, for example. The tightening provided by the device is not affected by position or assembly force, and depends solely on the characteristics of the device itself. Assembly is very easy and quick as said device is incorporated in one of the beams of the connection and moves along the grooves or guides thereof for fastening beneath the flange of the other beam incorporated in the connection, being fitted by elastic deformation and pressing one beam against the other depending thereon. Furthermore, the beam connection allows some variation of the angle relative to the perpendicular.

It will be understood that the construction of the device according to the invention, which has been shown in an example in the form of a rod, would be able to adopt different structures whilst retaining the functional characteristics according to the invention. Thus, for example, instead of rods, tubes or a mixed tube and rod assembly could be used. Similarly, mixed plate and rod versions or alternatively plate and tube versions could be envisaged. Thus, for example, the upper straight extensions which extend from the vertical arms in the basic embodiment of the rod could be replaced with a planar zone produced in the same straight extension or by welding a plate.

Similarly, it can be seen that although the devices for fastening formwork beams have been shown in the examples sliding along the upper of the two beams that form a connection, it would also be possible to envisage a reverse arrangement in which said devices would slide along the lower beams being fastened to the upper beams of the connection.

It can also be seen that the device according to the invention is, on account of its intrinsic characteristics, easily recycled and can be applied subsequently to other connections, as its characteristics practically do not vary with use.

The superior security characteristics offered by the connection can also be seen, guaranteeing a firm and stable fastening of the two beams of the connection and preventing the upper beam from turning over, for example when people move around or in similar circumstances.

In order to be able to apply the device to the connection formed by two beams, making use of the resilience of the material of the device, for example, a pre-stressed rod having resilient springy characteristics, the components used to apply pressure initially form a slight angle relative to the surfaces on which said components must press. Thus, for example, the lower U-shaped bridge forms a particular angular convergence relative to the upper straight extensions, so as to produce the correct pressure on the horizontal span of the lower bridge and on the upper straight extensions.

Given the characteristics of the device according to the invention, the tightening force applied to the flanges of the beams to be connected does not vary due to the effect of any vibrations applied to the assembly, as may occur in devices which comprise threaded parts comprising nuts or similar components, connections using wedges or other assemblies.

Although the invention has been described on the basis of representative embodiments, it must be understood that said embodiments are not limiting and that the invention will be limited only by the scope of the accompanying claims. Moreover, clearly persons skilled in the art, after acquainting themselves with the present invention through its description, claims and drawings, may introduce multiple modifications which, in not departing from the spirit of the invention, will be included within the scope thereof.

BRIEF DESCRIPTION OF THE DRAWINGS

To aid understanding, explanatory yet non-limiting drawings are included of embodiments of the present invention.

FIG. 19 is a view in elevation of the embodiment from FIG. 16.

DETAILED DESCRIPTION OF THE PREFERRED EMBODIMENTS

As can be seen in FIGS. 1 to 4, the detachable fastening device -100- for intersecting formwork beams, according to the present invention, comprises two curved arms -1-, -2- which converge in the upper portion thereof until reaching an even higher portion where said arms open, diverging to form what is commonly known as a 'goose foot' and which are connected to respective substantially horizontal spans -3- and -4-, which together with a cross member -5- form a U-shaped bridge. At the top, the arms -1- and -2- each terminate in bent zones -6- and -7- arranged in the same plane as the cross member -5-. The interconnection of said different components successively forming the fastening device based on a resilient steel rod is produced by means of multiple curved elbows, which for greater clarity have not been numbered specifically in the figures.

Figure 1:
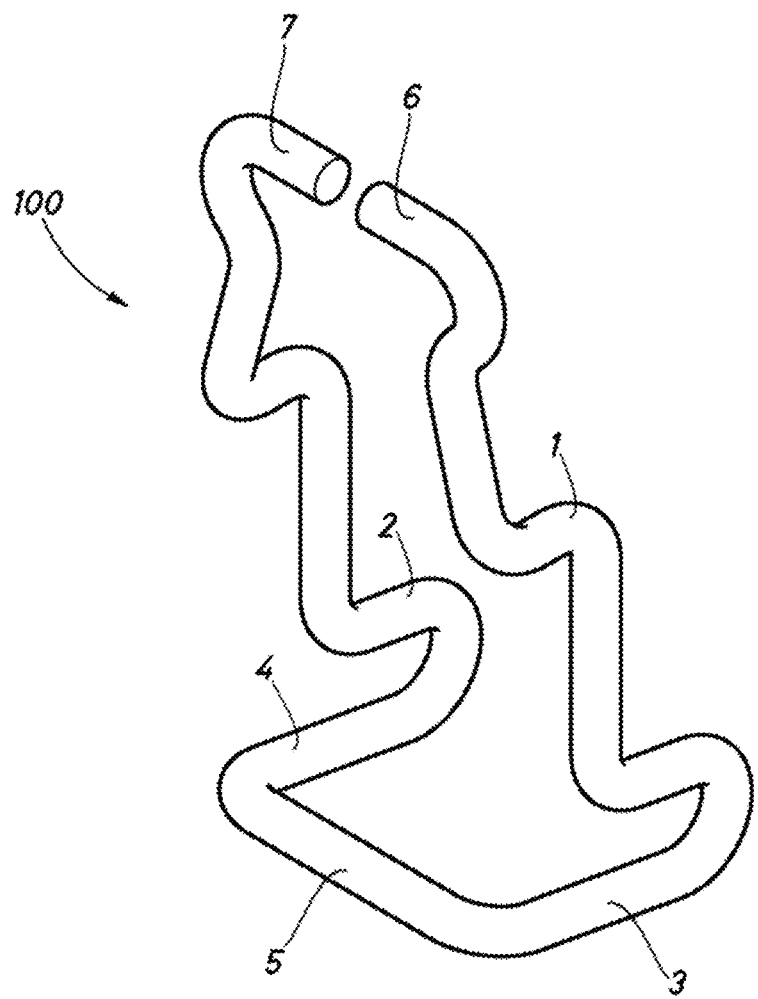
FIG. 1 is a perspective view of a device according to the present invention.
Figure 2:
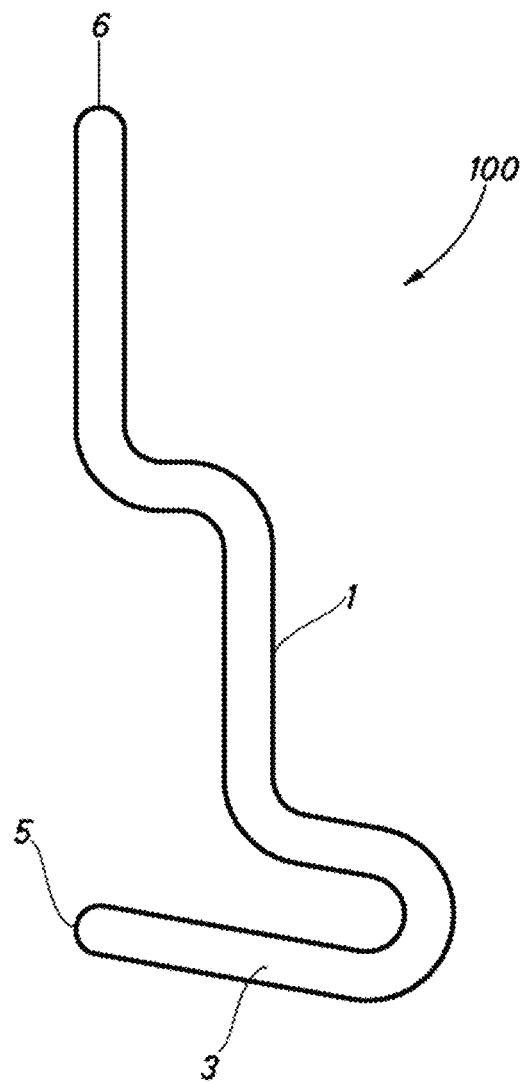
FIG. 2 is a view in side elevation of the device shown in FIG. 1.
Figure 3:
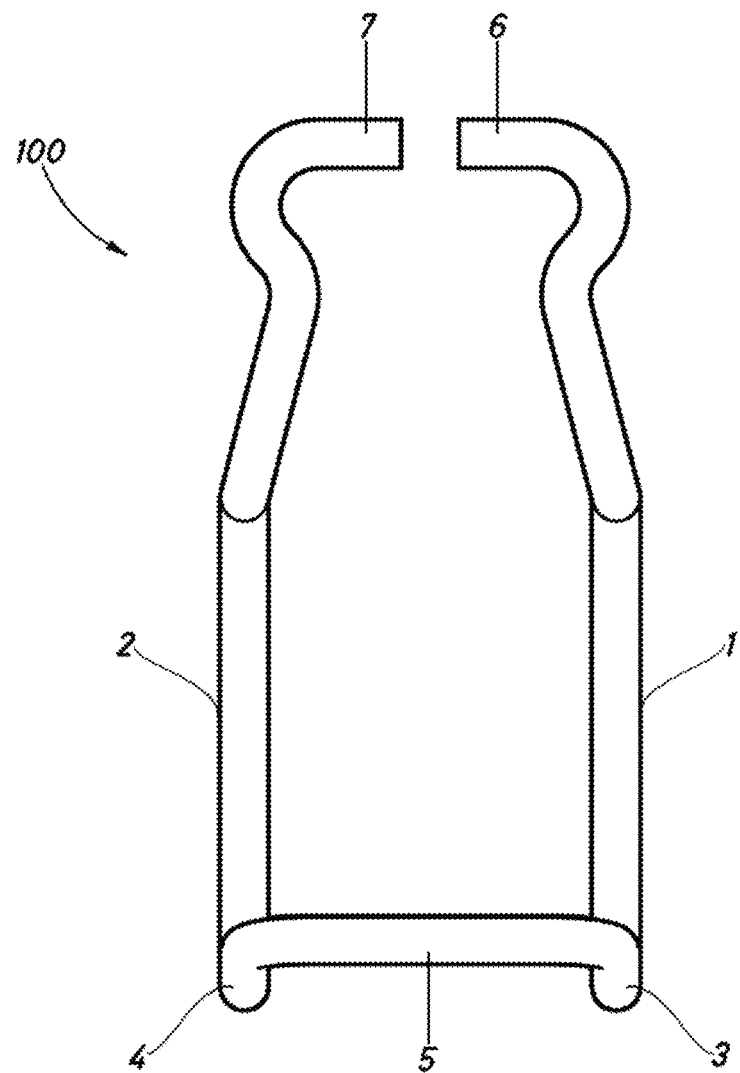
FIG. 3 is a view in elevation of the device shown in FIG. 1.
Figure 4:
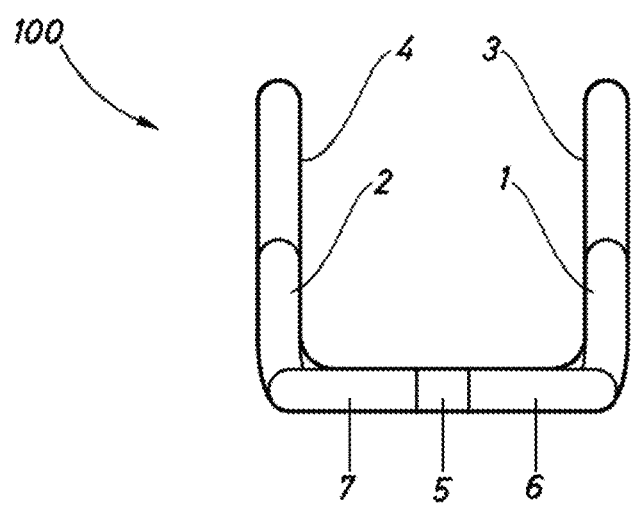
FIG. 4 is a plan view of the device shown in FIG. 1.
Figure 5:
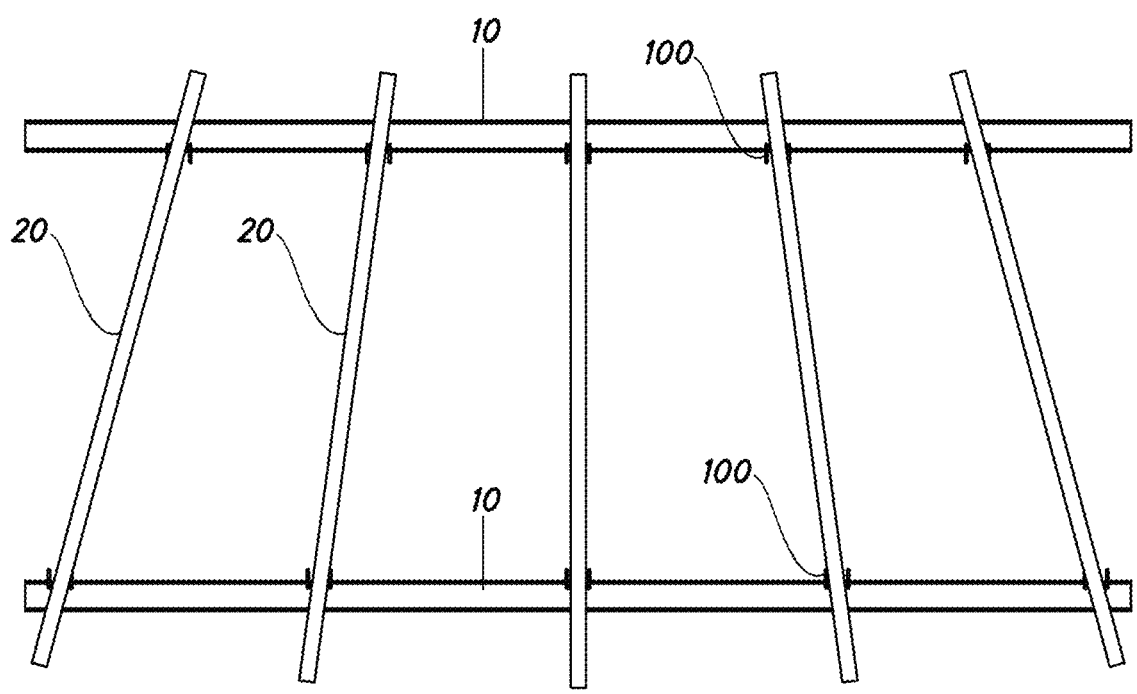
FIG. 5 is a plan view from above of two levels of formwork beams connected together by means of the device from FIG. 1.
Figure 6:
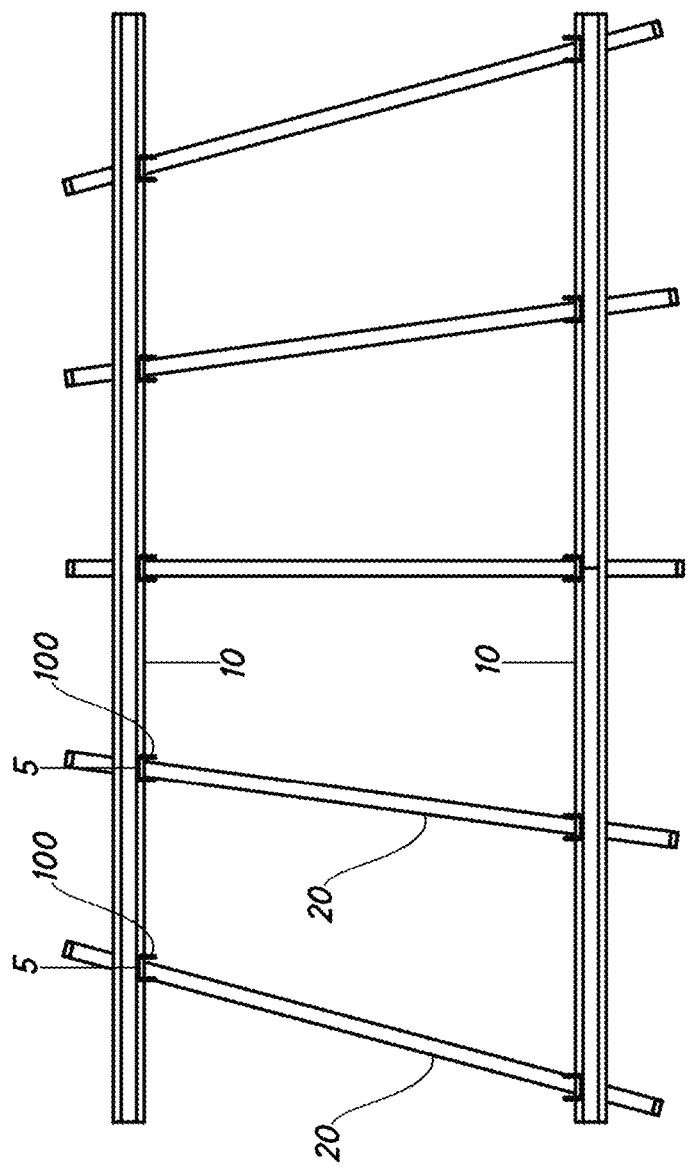
FIG. 6 is a plan view from below of the two levels of formwork beams shown in FIG. 5.
Figure 7:
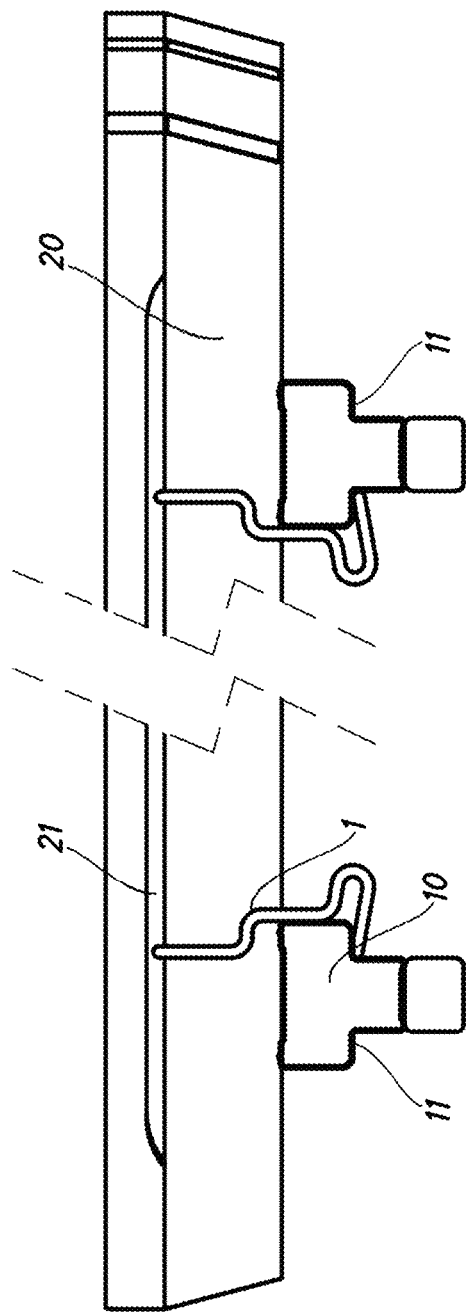
FIG. 7 is a view in side elevation of the two levels of formwork beams shown in FIG. 5.
Figure 8:
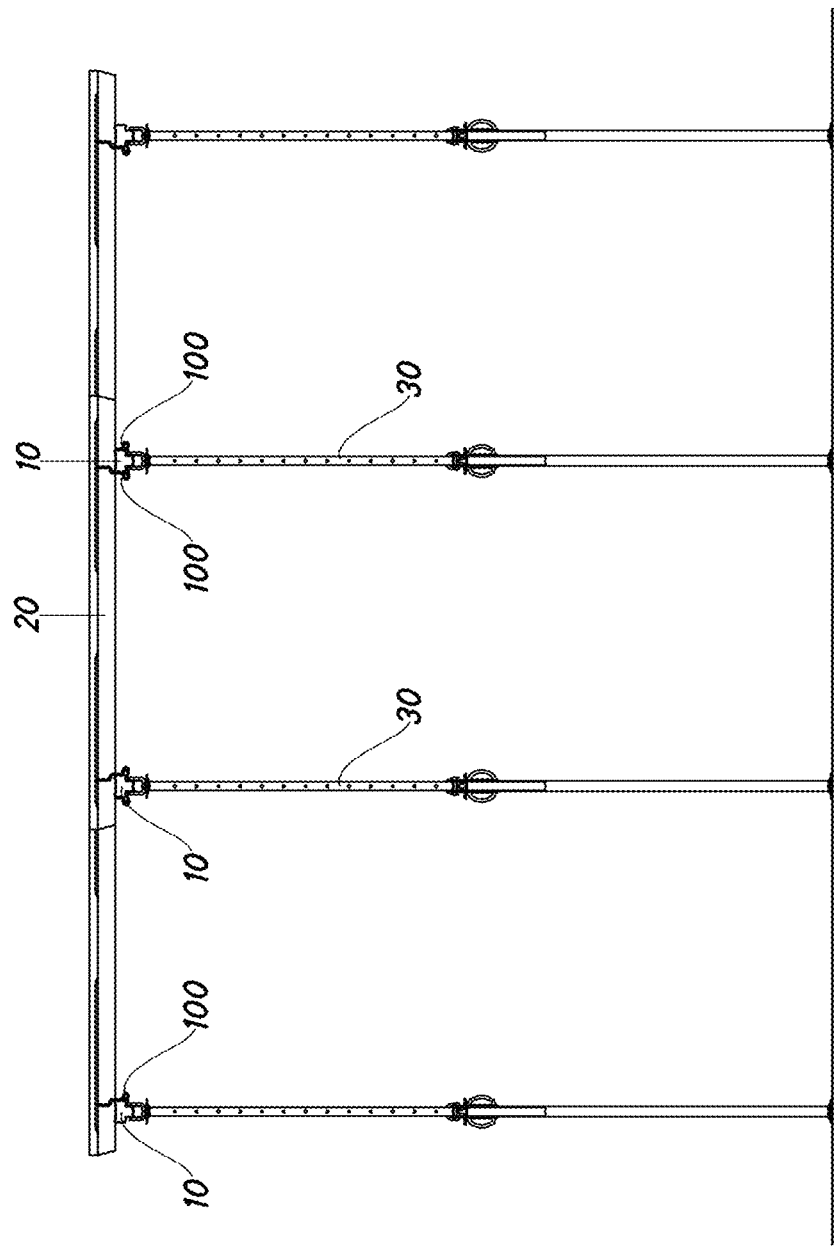
FIG. 8 is a view in elevation of two levels of formwork beams supported by props.

The purpose of the device according to the present invention is to produce a detachable connection for two intersecting formwork beams, which may be metal beams, for example, the beams -10- situated below and the beams -20- situated above, as shown in FIGS. 5 to 7, the beams -20- resting on the beams -10- and the beams -20- being intended to receive the formwork decking on the upper face thereof. The connection is produced by interposition of the device -100- according to the present invention, which, on account of its intrinsic characteristics, firmly and resiliently connects the upper flange -11- of the beams -10- situated below. To do this, the cross member -5- rests, applying pressure to the lower face of the upper flange -11- of the beams -10-, while the bent zones -6- and -7- are inserted into grooves -21- of the beams -20-. FIG. 8 shows the beams -10- situated below supported by props -30-.

Figure 9:
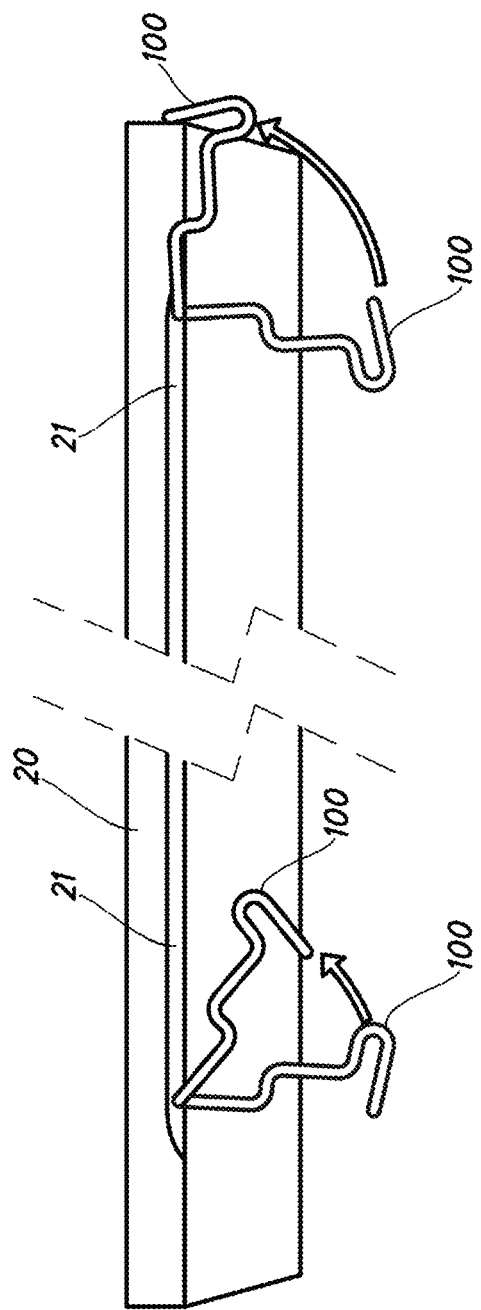
FIG. 9 is a view in elevation of a formwork beam forming part of an upper level of beams.

FIG. 9 shows an upper beam -20-. On the right-hand side of the figure, the beam -20- has a device -100- according to the invention in the transport position, in which the device -100- is rotated as indicated by the arrows. On the left-hand side, a position is shown in which another device -100- can tilt so as to avoid being damaged should the beam -20- fall to the floor, the device -100- being at any point on the beam.

Figure 10:
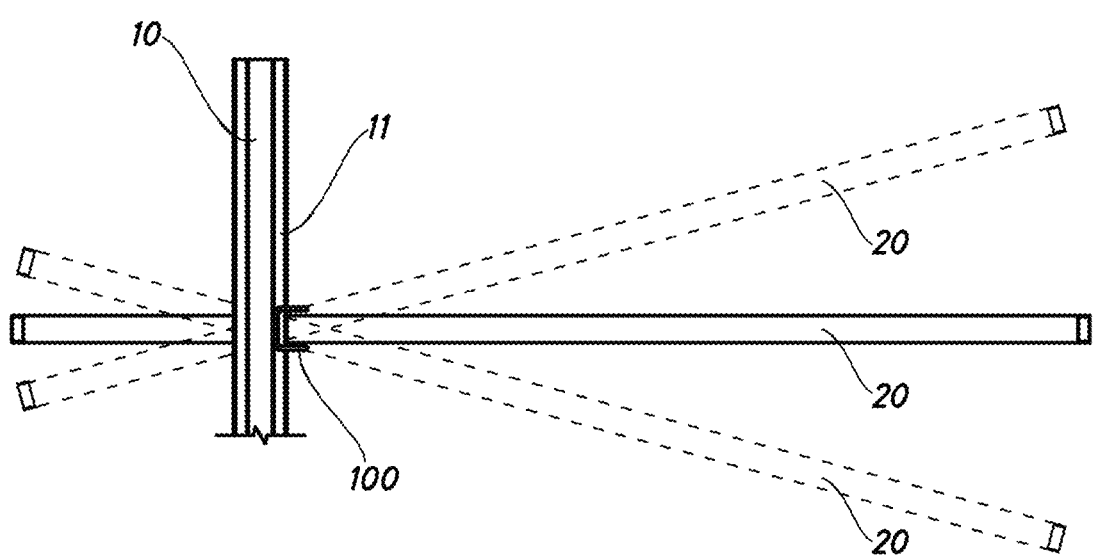
FIG. 10 is a plan view from below of a connection between two formwork beams using the device from FIG. 1.
Figure 11:
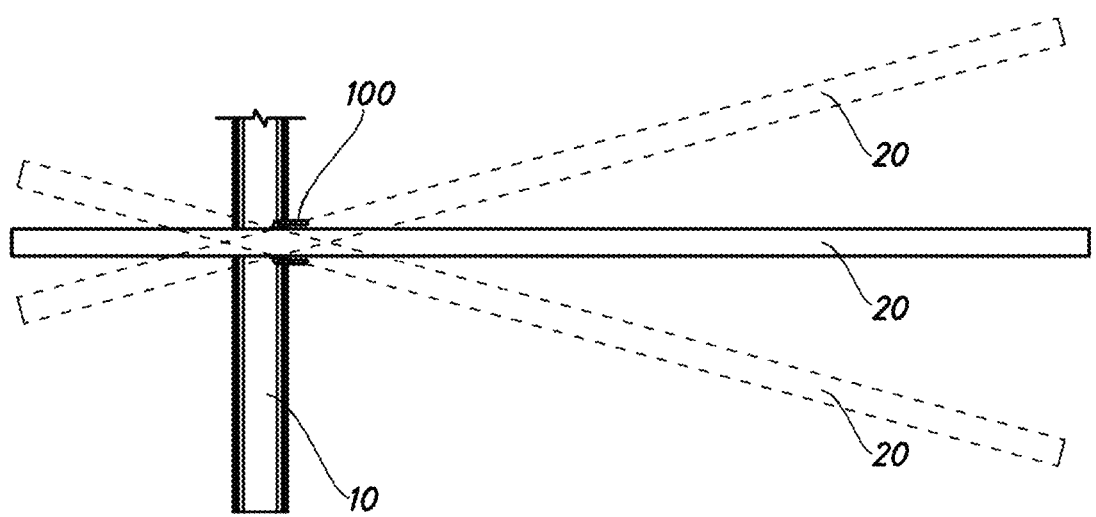
FIG. 11 is a plan view from above of a connection between two formwork beams using the device from FIG. 1.
Figure 12:
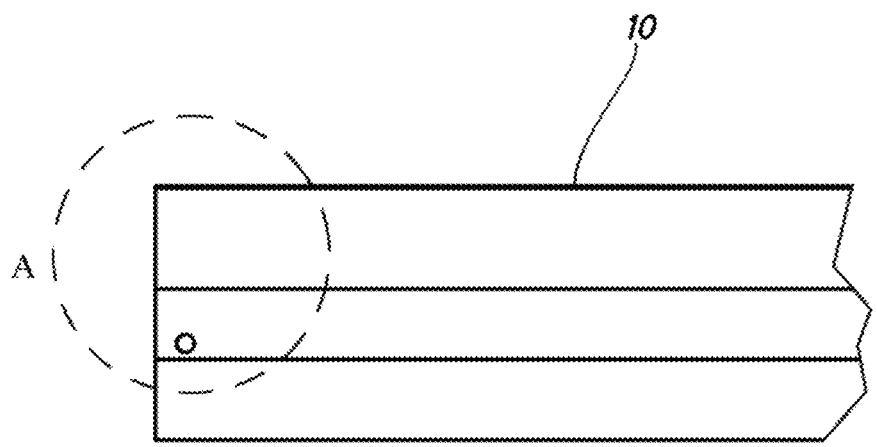
FIG. 12 is a view in side elevation of a formwork beam forming part of a lower level of beams.
Figure 13:
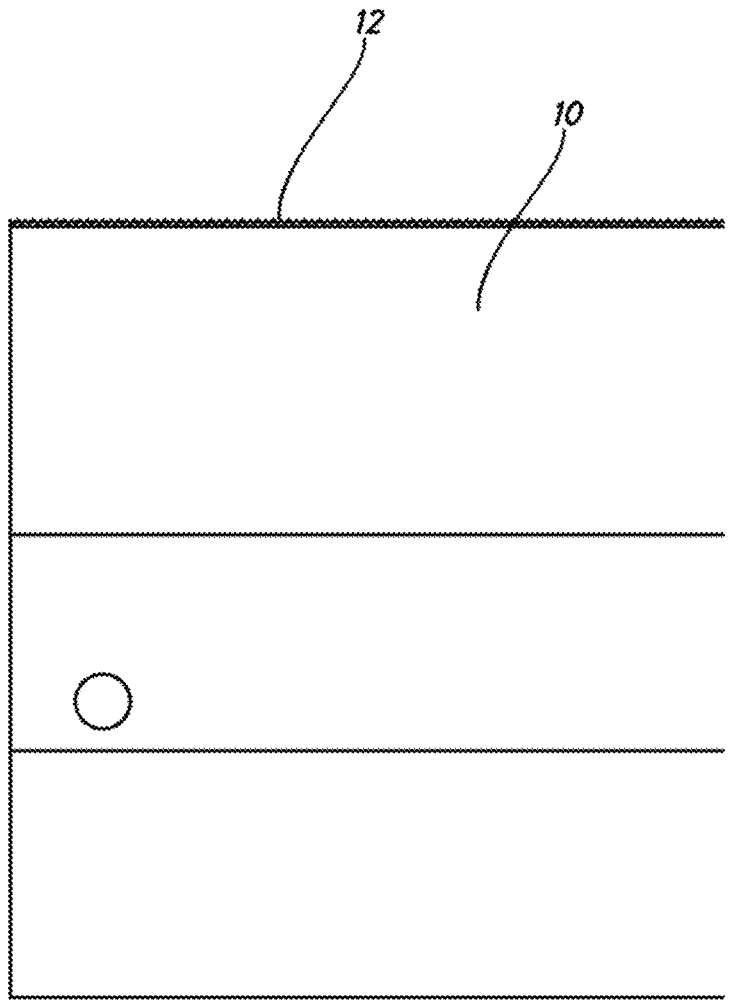
FIG. 13 is a view of the detail indicated in FIG. 12.
Figure 14:
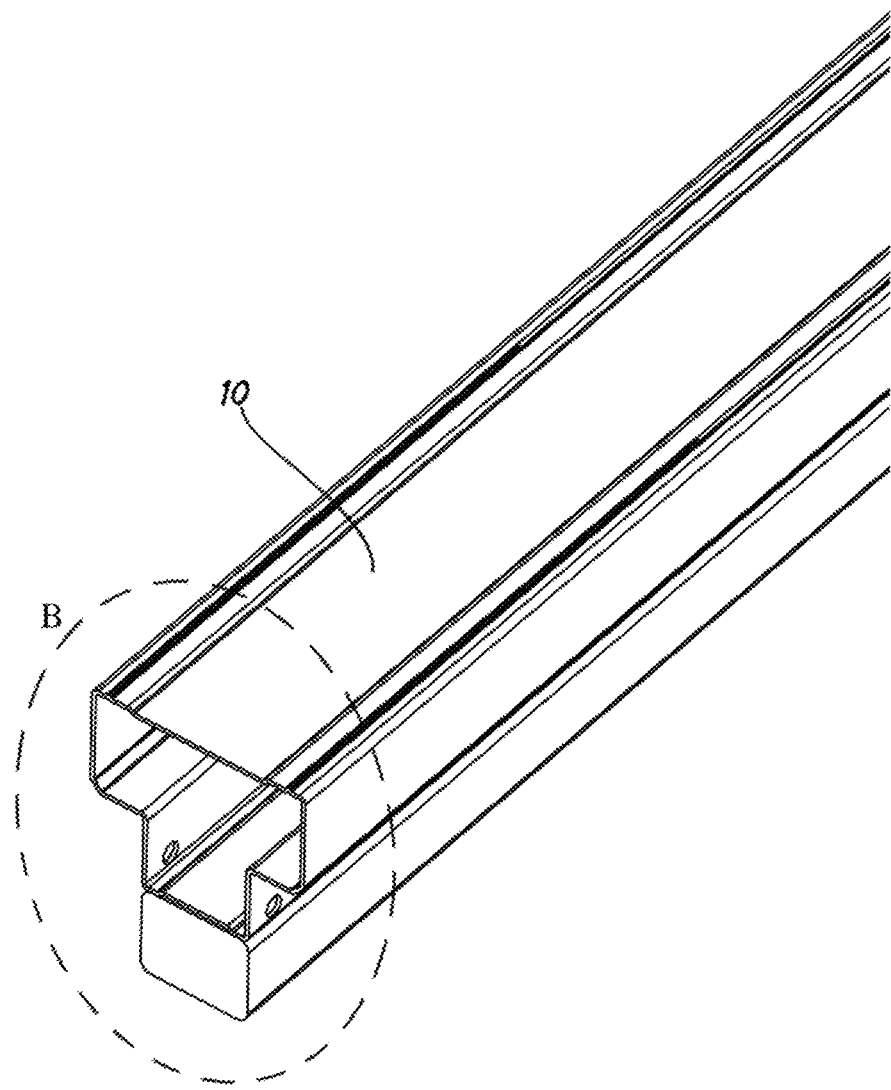
FIG. 14 is a perspective view of a formwork beam forming part of a lower level of beams.
Figure 15:
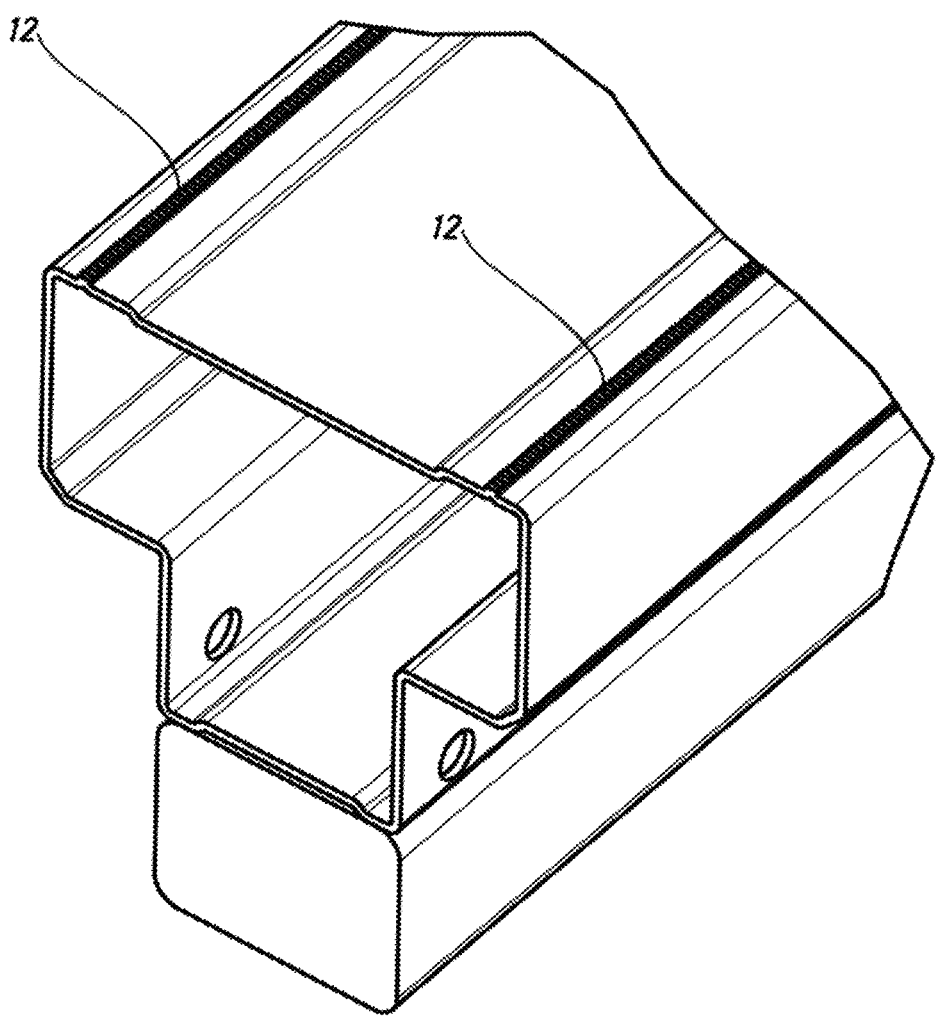
FIG. 15 is a view of the detail indicated in FIG. 14.
Figure 16:
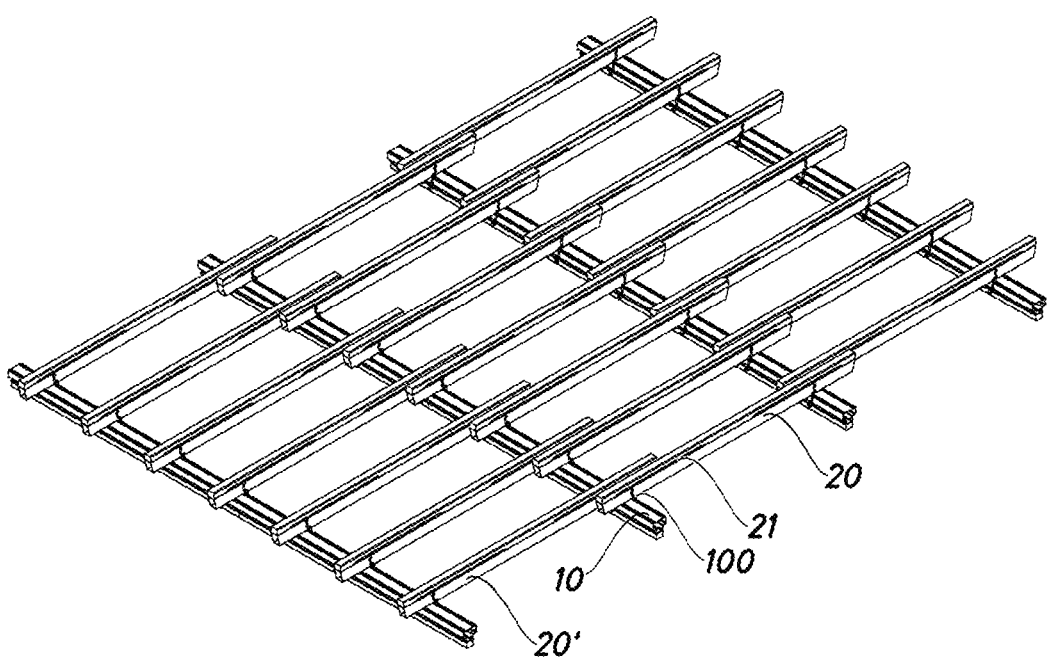
FIG. 16 is a perspective view of two levels of formwork beams connected together by means of devices from FIG. 1, the upper and lower beams being in a perpendicular arrangement.
Figure 17:
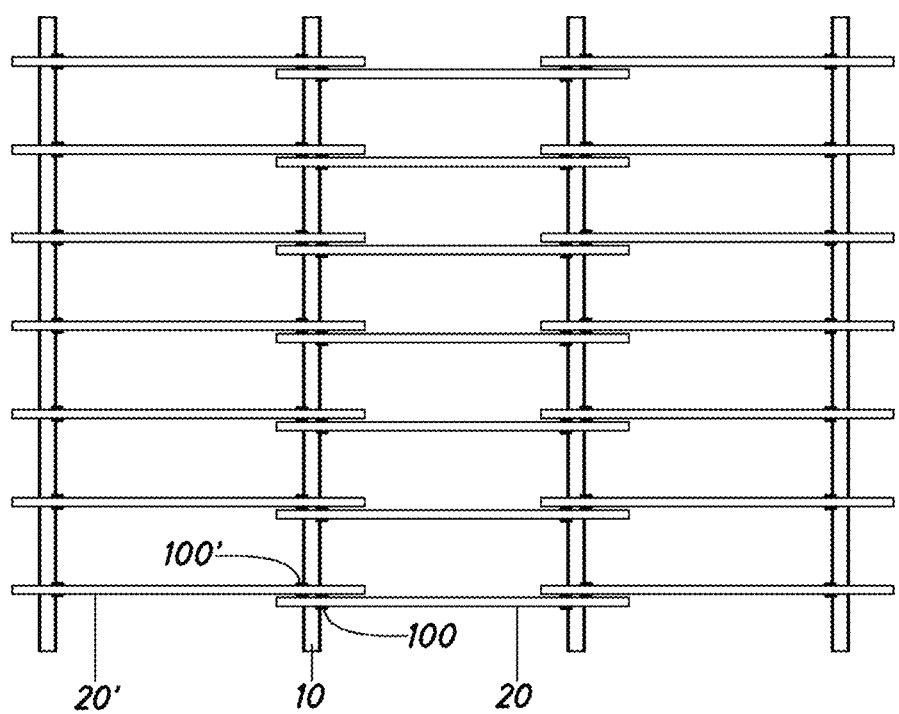
FIG. 17 is a plan view from above of the embodiment from FIG. 16.
Figure 18:
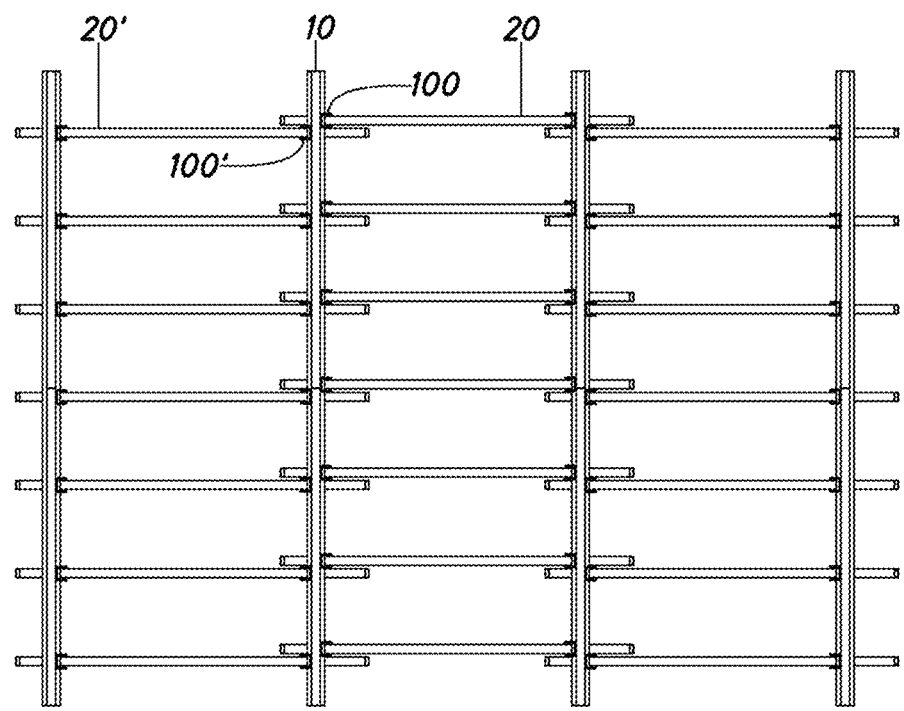
FIG. 18 is a plan view from below of the embodiment from FIG. 16.

FIGS. 10 and 11 show one of the characteristics of the device -100- according to the invention, which allows slight misalignment of the usual arrangement at a right angle of the beams to be connected, in which situation the structure of the device allows said device to continue performing its tightening function regardless of said angular divergence. It should be emphasised that the possibility of connecting beams that are not perpendicular is a great advantage which is obtained by rotating the devices -100- relative to the beams -20- on which they are carried, so as to achieve complete insertion below the flanges of the beams -10-, as shown in FIGS. 5, 6, 10 and 11. It should be noted that, while the cross member -5- of the device -100- remains in contact with the flange -11- of the beam -10-, the compression force will not vary, which provides great security characteristics. It should be noted that the misalignments are not due to sliding between beams once the device -100- is positioned, rather, the misalignments occur before the device -100- is fastened to the beams -10-, -20-.

It should also be noted that, given that the compression force applied by the device according to the invention depends on its intrinsic structure, said applied force will be independent of the force used to insert the device in the assembly, for example, which may require more or less energy at the time of assembly. The basic characteristic for the device to fulfil its function consists solely in the pressure components, that is, for example, the cross member -5-, being situated above the surface to be compressed, regardless of the greater or lesser degree of penetration thereon or of the angle relative to said surfaces to be pressed, which may vary owing to the misalignment of the beams to be connected or owing to a particular divergence of the device itself when installed.

In FIGS. 12 to 15, the grooving on the upper surface of the lower beams -10- can be seen. The grooving -12- is toothed which, on coming into contact with the upper beam and being pressed against each other by means of the fastening device -100-, produces increased friction between beams. Moreover, the pre-stressing of the device -100- means that the stress applied prevents sliding between beams more effectively, producing a very stable connection between beams. The protuberance may also be incorporated in either or both of the beams.

FIGS. 16 to 19 show another embodiment of the device according to the present invention, the lower beams and upper beams being in a perpendicular arrangement. For reasons of clarity, the props that would support the assembly, as in FIG. 8, have not been shown.

In FIGS. 16 to 19, identical or similar components to those of the previous figures have been designated with identical reference numerals. They will therefore not be explained again. It can be seen that the system comprises nodes at which a lower beam and two upper beams coincide, the upper beams being adjacent to each other, and each of the upper parts being connected to the lower beam by a device according to the present invention, each of the devices which connect the respective upper beams to the lower beam of the node being arranged on opposite sides of the lower beam.

Although the invention has been set out and described with reference to embodiments thereof, it should be understood that these do not limit the invention, and that it is possible to alter many structural or other details that may prove obvious to persons skilled in the art after interpreting the subject matter disclosed in the present description, claims and drawings. Therefore, the scope of the present invention includes any variant or equivalent that could be considered covered by the broadest scope of the following claims.

What is claimed is:

1. A detachable fastening system for two intersecting formwork beams, said beams forming between them a non-zero angle, and said system comprising:
   an upper beam of the beams for supporting formwork panels,
   a lower beam of the beams on which the upper beam rests and which forms a non-zero angle with the upper beam and
   a device for connecting the upper beam to the lower beam, wherein:
   said device comprises a resilient one-piece structure having two curved arms which connect zones intended to press on one of said beams in support zones and zones intended to be fastened to other beam of said beams,
   the device is configured to fasten the beams so as to allow said beams and the device to be handled together like a single part,
   the device having the ability to slide relative to the upper beam to which it is fastened, and
   the system comprising a protuberance on a contact face between said upper beam and said lower beam for increasing the friction between the lower beam and the upper beam, said protuberance being located on an upper surface of the lower beam but not on a lower surface of the upper beam, wherein the protuberance comprises two parallel, toothed lines arranged longitudinally and projecting from the upper surface of the lower beam,
   said device being pre-stressed together with the protuberance of the lower beam and causes elastic deformation of the device and pressing the upper beam and the lower beam against each other.

2. The detachable fastening system according to claim 1, wherein said protuberance is located on said upper surface of the lower beam.

3. The detachable fastening system according to claim 1, wherein the device is pre-stressed.

4. The detachable fastening system according to claim 1, wherein the contact surfaces between the beams and between the beams and the device are all metal.

5. The detachable fastening system according to claim 1, wherein bent zones of the device slide along lateral grooves of the upper beam of the two intersecting beams.

6. The detachable fastening system according to claim 1, wherein the material of the one-piece structure of the device is a resilient rod.

7. The detachable fastening system according to claim 6, wherein the rod made of a resilient material has two curved arms which terminate at the upper ends thereof in bent zones inserted in grooves arranged on the upper beam, whilst at the other end said two curved arms extend as a cross member for pressing on support zones of the lower beam to be fastened.

8. The detachable fastening system according to claim 7, wherein the curved arms together with the cross member form a U-shaped bridge.

9. The detachable fastening system according to claim 7, wherein the two curved arms form between them a slight angular divergence, opening upwards.

10. The detachable fastening system according to claim 8, wherein the U-shaped bridge is planar.

11. The detachable fastening system according to claim 1, wherein the support zones of the beams to be connected comprise flanges of the one beam of the beams.

12. The detachable fastening system according to claim 11, wherein the flanges of the one beam of the beams are upper flanges of the lower beam.

13. The detachable fastening system according to claim 1, wherein the material of the structure of the device is steel.

14. The detachable fastening system according to claim 1, wherein the material of the structure of the device is a synthetic material, a plastics material or a composite material.

* * * * *